Aug. 18, 1936.　　　　N. S. GILBERT ET AL　　　　2,051,252
DIRIGIBLE HEADLIGHT
Filed Feb. 21, 1935
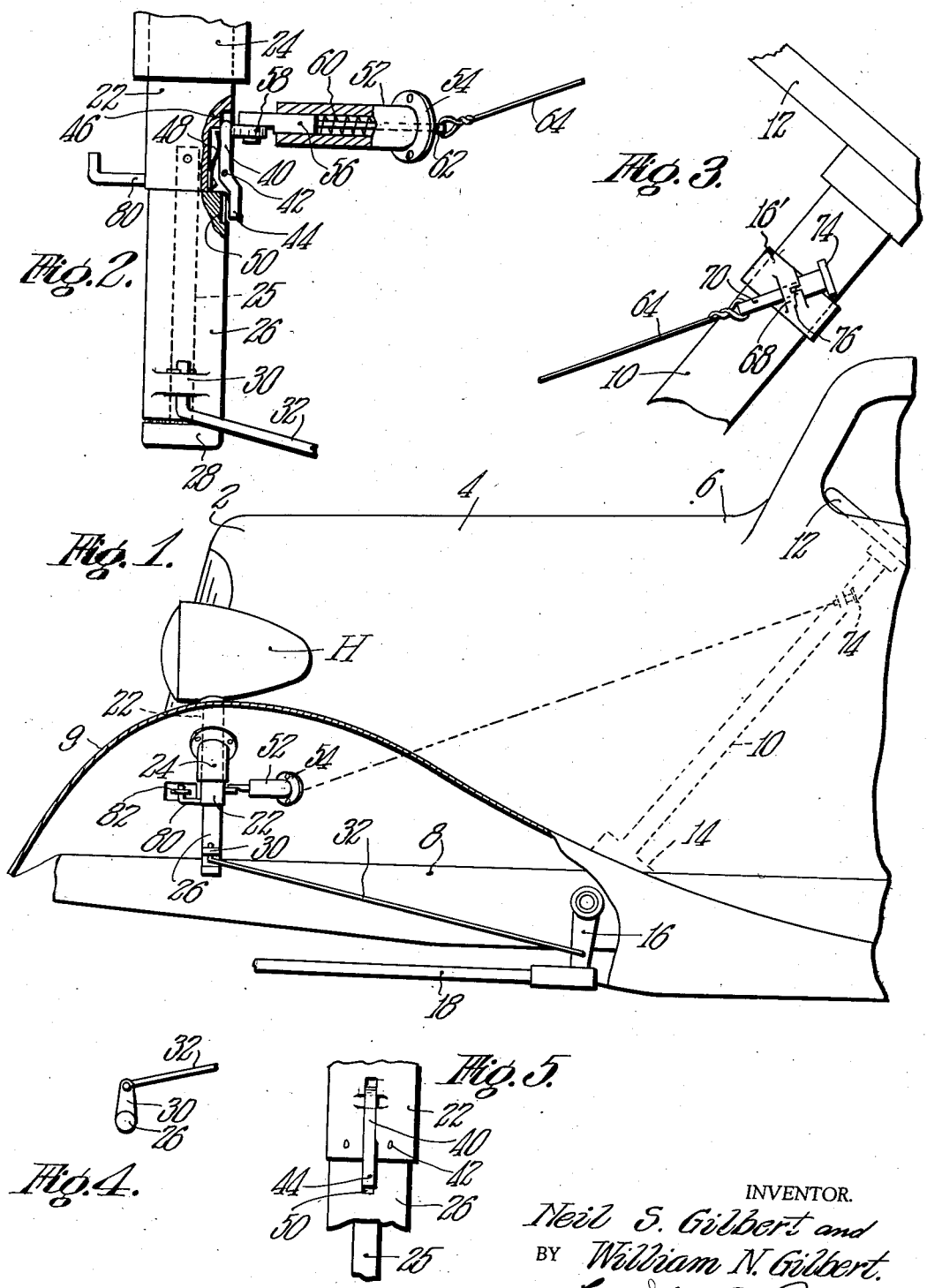
INVENTOR.
Neil S. Gilbert and
BY William N. Gilbert.
Walter C. Ross
ATTORNEY.

Patented Aug. 18, 1936

2,051,252

UNITED STATES PATENT OFFICE 2,051,252

DIRIGIBLE HEADLIGHT

Neil S. Gilbert, Springfield, Mass., and
William N. Gilbert, Waterbury, Vt.

Application February 21, 1935, Serial No. 7,520

1 Claim. (Cl. 240—62.52)

This invention relates to improvements in lighting apparatus and is directed more particularly to improvements in dirigible headlight apparatus for automobiles and the like.

The principal objects of the invention are directed to the provision of means whereby an automobile headlight is oscillated accordingly as the steering mechanism is operated. As a special feature of our invention, means is provided to connect and disconnect the novel oscillating means from the headlights.

Various other novel features and advantages of this invention will be hereinafter more fully referred to in connection with the following description of the present preferred form thereof and reference will be had to the accompanying drawing wherein:

Fig. 1 is a partial elevational view of the front end of an automobile having the novel features of the invention associated therewith;

Fig. 2 is a side elevational view of the stem of the headlight and certain operating mechanism;

Fig. 3 is a fragmentary side elevational view of the steering column of an automobile to explain certain features of the invention;

Fig. 4 is a small scale inverted plan view of the stem of the headlight; and

Fig. 5 is a rear end elevational view of a part of the headlight stem shown in Fig. 2.

Referring now to the drawing more in detail the invention will be fully described.

In Fig. 1 there is shown a forward end portion of an automobile in certain detail and will facilitate the understanding of the novel features of this invention. The radiator, hood, and cowl of an automobile are represented at 2, 4 and 6 while the side frame is indicated by 8. A fender or mud-guard 9 is associated with the forward end of the frame (which is shown cut away for clearness) and a steering column 10, having a steering wheel 12 as shown, extends upwardly from a gear box or the like 14.

The part 14 is operatively connected to a swinging arm or lever 16. As the steering wheel 12 is moved or rotated in one direction or the other the column 10 is rotated and, by means of the mechanism formed and contained in the box 14, the lever 16 is swung back and forth.

The lever member 16 is usually connected, as by a link 18, to the wheel associated with the forward part of the frame. However, the wheel together with the axle and the mechanism connected to the link 18 are not a part of this invention and are not therefore shown.

The apparatus of the present invention may be actuated by many various mechanisms and for that purpose the lever or arm 16 is utilized and may be referred to as the actuator member.

A headlight is shown at H and, of course, there will be one of said headlights on either side of the car at the forward end. Since they are preferably substantially alike in construction, however, only one is herein described.

The headlight H has a stem such as 22 which is arranged to be rotatable in some suitable means such as a bracket 24 which may be associated with the fender 9. The stem 22 extends through the bracket 24 and an oscillator 26 is oscillatable thereon. A support 28 may be associated with the lower end of the shaft 25 to support the member 26 and facilitate the free rotation thereof.

A lug such as 30 extends outwardly from the part 26 and a rod such as 32 has an end extending through the lug 30 and another end through the actuator 16. This rod 32 serves as a connection between the member 26 and the arm 16 so that the former is oscillated by swinging movements of the latter.

According to this invention, it is desired to connect and disconnect the part 26 from the stem 22 of the headlight so that at the will of the operator the headlight may be oscillated by the steering mechanism. To accomplish this the following novel mechanism is provided.

The lower end of the stem 22 is grooved to receive a lever such as 40 which is pivoted at 42 and has a lower free end 44 and an upper end portion which is adapted to abut a shoulder 46. A spring 48 is preferably secured in the groove 35 in such a way that its upper end bears on the lever and tends to urge its upper end portion outwardly and its lower end inwardly.

A groove 50 is provided in the side of the member 26 and this receives the lower end 44 of lever 40. With this part 44 in the groove 50 it will be apparent that as the part 26 is oscillated, the stem 22 and therefore the headlight H will be oscillated.

When the part 40 is in the position shown in Fig. 2, the part 26 may oscillate without oscillating the stem.

A guide or bracket 52 is provided which may have a flange 54 for securing to the fender. A member 56 is slidable therein and has on its outer end a rotatable roll 58. A spring 60 is disposed within the member 52 which is under tension to urge the member 56 forwardly so that the roll 58 is caused to yieldingly bear on the stem or on the lever 40.

A tail-piece 62 extends from the part 56 and is disposed rearwardly of the bracket. A pull rod in the form of a wire 64 has one end connected to this tail-piece 62.

A clamp 16' may be associated with the steering column and this has a boss 68 thereon in which is slidable a rod 70. The other end of the pull rod 64 is connected to the rod 70 as shown.

A knob 74 is preferably provided on the upper end of the rod 70 and this may be engaged by the fingers so that the rod 64 may be pulled against the action of spring 60 and thereby move the roll 58 away from the lever 40 so that the lower end thereof is urged into the notch of the member 26.

A pin 76, carried by the rod 70, is receivable in a slot as shown. With this arrangement, when the rod is pulled outwardly to carry the pin 76 from out of the slot, the rod may be rotated slightly so that the pin will rest on the upper side of the boss 68 and in that way hold the roll 58 out of engagement with the lever 40. Then, of course, the knob 74 and rod 70 may be again rotated to bring the pin into register with its slot in the boss.

With the parts in the position shown in Fig. 2, the member 26 is oscillated accordingly as the steering member 16 is swung back and forth and in this position of the parts the headlight H is directed straight ahead. When it is desired to bring about movements of the headlight on its axis of rotation the knob 74 is grasped to pull upon the member 64 and remove the roll away from the lever.

With the lower end of the lever engaged in the slot, the stem rotates with the member 26 and when it is desired to disconnect the actuating means from the headlight stem, the knob 74 is positioned so that the spring will urge the part 56 carrying the roller forwardly. In case the lever 40 is not at the time directly in front of the roller, the roller will ride on the stem as it is oscillated but when the stem is positioned so that the roller engages the lever 40, the spring 60 causes the lever to be swung so that its lower end leaves the notch or groove in the part 26.

From the foregoing it will be observed that not only is it possible to rotate the headlight accordingly as the steering mechanism is operated but it is possible to connect and disconnect the actuating mechanism from the headlight as may be desired by the operator.

While we have shown and described but a single headlight, it will be apparent that a pair of headlights may be provided as is usual in automobile constructions. With this arrangement the headlight shown may operate the headlight on the other side of the car and to facilitate this there is shown in Fig. 1 an arm 80 extending from the stem 22 which is connected to one end of a link 82 which may have its other end similarly connected to said other headlight.

While we have described the invention in great detail and with respect to a preferred form thereof, it is not desired to be limited thereto since many changes and modifications may be made therein without departing from the spirit and scope of the invention.

What is desired to claim and secure by Letters Patent of the United States is:

The combination with an automobile having a steering member movable back and forth and a driver's compartment of lighting apparatus comprising, a support, a bracket member associated with and in a fixed position relative to said support, a headlight having a stem member oscillatable relative to said support, a member oscillatable on said stem member and provided with a notch therein, a swinging lock lever pivoted to said stem member having a locking end part which is receivable in said notch of the oscillatable member, a spring acting on said lever urging said locking end part thereof into said notch when the oscillatable member and stem are in a certain relative position to operatively connect said oscillatable and stem members, connections between said oscillatable and steering members whereby the oscillatable member is oscillated by the steering member, a spring-pressed actuating member slidable in said bracket having a rotatable roll on its forward end for yieldingly bearing on said lock lever and rolling on said stem member as it oscillates adapted to swing said lever and move said locking part out of said notch and disconnect said stem and oscillator member, and manually engageable means connected to said actuating member and extending into said compartment arranged to move said actuating member rearwardly and move said roll out of engagement with said lock lever.

NEIL S. GILBERT.
WILLIAM N. GILBERT.